Dec. 3, 1963     K. V. KORDESCH ET AL     3,113,050

CATHODES FOR PRIMARY AND RECHARGEABLE CELLS

Filed Sept. 12, 1960

INVENTORS
KARL V. KORDESCH
ROBERT E. STARK

BY *John F. Hohmann*

ATTORNEY

3,113,050

United States Patent Office
Patented Dec. 3, 1963

3,113,050
CATHODES FOR PRIMARY AND RECHARGEABLE CELLS
Karl V. Kordesch, Lakewood, and Robert E. Stark, Avon Lake, Ohio, assignors to Union Carbide Corporation, a corporation of New York
Filed Sept. 12, 1960, Ser. No. 55,323
7 Claims. (Cl. 136—123)

This invention relates to cement-and latex-bonded cathodes for use in primary and rechargeable cells. More specifically it relates to cathodes which undergo expansion and contraction during charge and discharge.

Cathode elements used in primary dry cells and in rechargeable cells conventionally consist of mixtures of oxidic depolarizers, non-reactive conductive powders and, in some cases, a suitable electrolyte. The mixtures are molded or compressed into a bobbin or a plate, and then inserted in the cells.

In most dry cell systems, graphite and acetylene black generally are the conductive powders. In other systems the conductive component in the cathode element may include metal powders such as nickel powder. The oxidic depolarizer may be manganese dioxide, nickel hydroxide, vanadium pentoxide and the like.

It has been discovered in accordance with the present invention that the cell performance under high current drains can be increased appreciably by retaining the intimate physical bond between the cathode components during the entire service life of the cell. This has been achieved by incorporating in conventional dry cell cathode mixes a rubber-like latex material in the form of a solution, suspension, or emulsion and a silicate binder.

The principal object of the present invention then is to provide improved means and methods for maintaining the integrity of cathodes under the most severe cycling conditions.

Another object of the invention is to provide a bonded cathode which may be readily extruded into a metallic cell container.

Another object of the invention is to provide a bonded plate cathode adapted for use in stacked cell constructions.

The electrodes of the invention comprise finely divided particles of oxidic depolarizing material together with carbonaceous particles, an inorganic silicate binder, a rubber-like material and, optionally, steel wool.

Among the oxidic depolarizing material used in making, for various cell systems, the electrodes of the invention, are manganese dioxide, mercuric oxide, silver oxide, copper oxide, vanadium pentoxide, nickel hydroxide and the like.

Suitable carbonaceous particles incorporated in the cathode of the invention include carbon black, acetylene black, graphite and mixtures thereof.

The cement binder employed, in an amount ranging from about 2.5 to about 10 percent by weight of the cathode weight, may be Portland cement, "Sorel" cement (a mixture of magnesium oxide and magnesium chloride) as well as various calcium-aluminum silicates, which do not affect cell operation, owing to their inertness in the ambient electrolyte.

The cement material integrally unites the depolarizer and carbonaceous particle, and constitutes a substantially continuous common matrix for both types of particles. Optionally, the cathodes of the present invention may contain from 2 to 20 percent of their weight of steel wool or other filamentary conductive materials, the lengths of which exceed their diameters.

The cathodes of the invention also contain from about 2.5 to 20 percent by weight of the total cathode of an elastic rubbery material such as natural rubber and synthetic rubbers such as chlorinated butadiene, copolymers of butadiene with acrylonitrile, vinylidenes such as vinylidene chloride polymers, polymeric isobutylene, butadiene-styrene copolymers.

In order to maintain good conductivity of the cathodes, the maximum total amount of the cement-latex binder preferably should not exceed 25% in the aggregate by weight of the total cathode.

A solution of the rubber in an organic solvent may be used instead of a suspension or an emulsion provided, of course, that the solvent selected has no harmful effects on other cathode components. Also, rubbers in solid, particulate, form may be used if sufficient liquid is added to set the cement.

Figure 1:
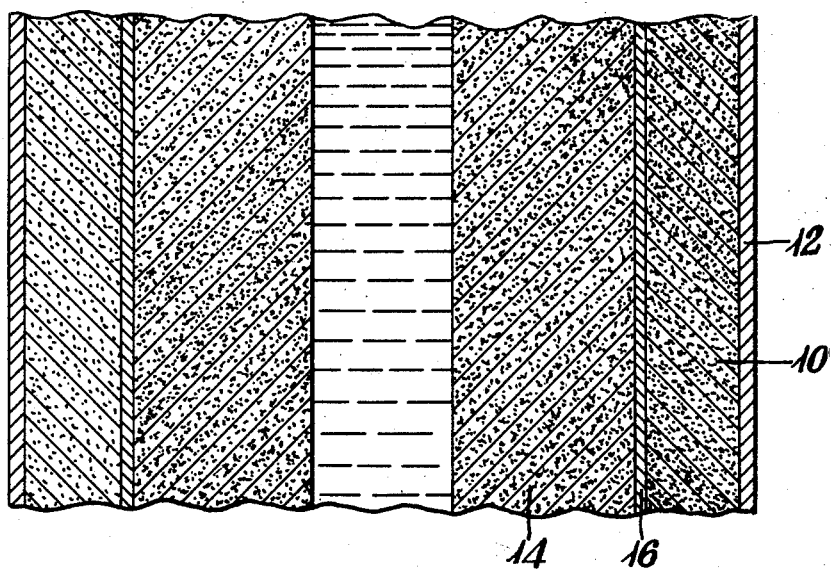
FIG. 1 is a fragmentary view of a cell using a cathode made in accordance with the invention.

Referring now to FIG. 1, there is shown a fragment of a cell having a shaped cement-and latex-bonded cathode 10, fitting in a steel can 12, and separated from anode 14, by means of a separator 16. The anode shown may be of the type described and claimed in the copending application of E. E. Leger, Serial No. 689,086, filed October 9, 1957, now Patent No. 2,993,947. This anode is composed of aggregates of consumable metal held in a semi-rigid state by a binding agent compatible with the electrolyte. It should be understood, however, that the herein-described cathode can be used also in conjunction with conventional cell constructions using sheet anodes.

To illustrate the superiority of the present cathodes over cathodes containing a cement binder only, two cathode plates were prepared, plate 1 containing Portland cement and plate 2 which contained Portland cement and a latex. These plates were fabricated by molding the following mixtures onto expanded steel grids. (The finished plate size was 1⅞ ins. x 2⅞ ins. x 0.04 in.)

*No. 1*

| | Percent by wt. |
|---|---|
| $MnO_2$ | 67.5 |
| Portland cement | 6.8 |
| Graphite | 11.5 |
| Acetylene black | 2.1 |
| 9 N KOH | 12.1 |
| | 100.0 |

*No. 2*

| | |
|---|---|
| $MnO_2$ | 58.10 |
| Portland cement | 5.90 |
| Graphite | 9.94 |
| Acetylene black | 1.84 |
| Butadiene-styrene emulsion (25% by wt. rubber in emulsion) | 24.22 |
| | 100.00 |

That plate composed of formulation No. 1 disintegrated in 12 N KOH electrolyte within 15 minutes; whereas, the plate made from formulation No. 2 showing no evidence of disintegration after 336 hours' immersion time in the alkaline electrolyte.

Additional cathode plates made from the above formulations were discharged vs. zinc in KOH electrolyte at 1.2 amperes. The cement-bonded cathode disintegrated after only one discharge. The cement-and-latex bonded cathode continued to perform well even after 15 to 20 charge-discharge cycles. No spalling or cracking was observed.

The above examples illustrate electrode behavior under rather extreme conditions. Under less severe operating conditions where the cement binder alone performs well, it is still possible to observe additional benefits of the combination cement-latex binder. For example, a cylindrically shaped cathode as shown in FIGURE 1 was made according to the following formulation and placed in a standard D-size cell construction employing a zinc anode and KOH electrolyte.

*No. 3*

| | Percent by wt. |
|---|---|
| $MnO_2$ | 62.2 |
| Graphite | 12.4 |
| Steel wool | 6.20 |
| Portland cement | 6.20 |
| 2 N KOH | 6.80 |
| Butadient-styrene emulsion (25% by wt. rubber) | 6.20 |
| | 100.00 |

This cell was discharged at a current drain of 500 ma. No cracking was observed in the cathode after discharge. Normally, cells containing only a cement binder in the cathode would have exhibited some cracking of the cathode under these conditions.

In constructing the bonded cathodes of this invention, it is preferable to employ at least a small amount of liquid electrolyte with the binders and active ingredients in order to improve the conductivity of the finished electrodes. Very low cathode resistance is especially desirable for best flash current performance. In the case of KOH electrolyte, it is desirable to employ electrolyte of no greater than about 2 N concentration during electrode formulation in order to prevent coagulation of the latex material prior to setting of the cement.

Another technique for improving the porosity and ion permeability of the cathodes is the use of electrolyte soluble "fillers" which are known in the art. For example, small amounts (e.g. about 5% by wt.) of a salt such as $K_2CO_3$ incorporated in a cement-latex-bonded cathode aids in improving electrode conductivity by dissolving on contact with KOH electrolyte in the cell and leaving small passages for electrolyte throughout the electrode.

The concentration of the cement-latex binder may be varied as desired. It is believed that the concentration shown in Formulas Nos. 2 and 3 are as low as desired for very high current density applications. For lower current density use, binder concentration is not as critical. Higher concentrations of cement and latex than those shown in Formulas Nos. 2 and 3 may be employed, provided that significant decreases in conductivity of the bonded electrode are not incurred. The conductivity of the cathodes made according to Formula 3 is equivalent to those containing the same amount of a cement binder only, as was shown by successful flash current operation. Both types of cells were capable of operating at a current drain of 20 amperes over a period of 2 to 3 seconds (short-circuit conditions). Further, after complete discharge of the cells, only the cell containing the cement-latex-bonded cathode showed no evidence of cathode cracking.

Figure 2:
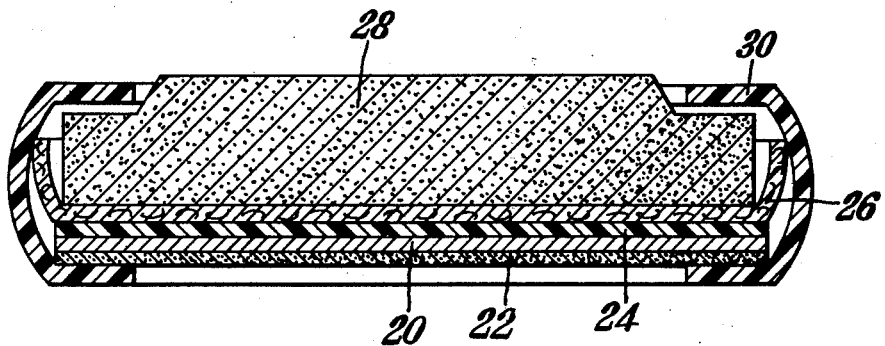
FIG. 2 is a vertical sectional view of a bonded plate cathode for use in stacked cells.

It should be understood that cathodes of any desired shape dictated by the geometry of the cells wherein they are intended to be used, may be fabricated in accordance with the invention. Thus there is shown in FIG. 2 a bonded plate cathode for use in flat stacked cells. Suitably such a construction comprises a zinc anode 20, having a conductive carbon coating 22, and a film liner 24, a paper separator 26, and cement-and-latex-bonded cathode mix cake 28, the entire unit being enveloped by a vinyl envelope 30.

A further advantage of employing the subject combination binder is that very thin flexible cathodes can easily be made by securing the cathode depolarizer mix on a suitable support such as a metal screen. Bonded cathodes of the order of about $\frac{1}{32}$ to about $\frac{1}{16}$ inch thick are quite flexible and can be rolled up for insertion in a cell. With the cement binder alone, such flexibility cannot be achieved.

What is claimed is:

1. A shaped cathode for dry cells, said cathode comprising finely divided carbonaceous particles, and finely divided oxidic depolarizing particles, said particles being integrally united by a binder which comprises a rubbery material and an inorganic cement, said rubbery material constituting from about 2.5 to 20 percent by weight of the cathode, said inorganic cement additionally constituting a substantially continuous common matrix for both depolarizing and carbonaceous particles.

2. The cathode of claim 1 additionally characterized by the presence therein of from 2 to 20 weight percent of steel wool.

3. The cathode of claim 1 wherein said particles are supported on an expanded metal grid.

4. The cathode of claim 1 wherein said cement is Portland cement.

5. The cathode of claim 1 additionally characterized by the presence therein of an electrolyte-soluble filler.

6. A flexible cathode according to claim 1, said cathode having a thickness ranging from about $\frac{1}{32}$ to $\frac{1}{16}$ of an inch.

7. The cathode of claim 1 wherein said rubbery material is chosen from the group consisting of natural rubber, chlorinated butadiene, copolymers of butadiene with acrylonitrile, vinylidene chloride polymers, polymeric isobutylene and butadiene-styrene copolymers.

References Cited in the file of this patent

UNITED STATES PATENTS

| 1,874,748 | Henderson | Aug. 30, 1932 |
| 1,940,528 | Bond | Dec. 19, 1933 |
| 2,662,064 | Mead | Dec. 8, 1953 |
| 2,962,540 | Kordesch | Nov. 29, 1960 |